(12) United States Patent
Carpenter et al.

(10) Patent No.: US 10,427,675 B2
(45) Date of Patent: Oct. 1, 2019

(54) METHODS AND SYSTEMS OF ACTUATING A CLUTCH OF A MANUAL TRANSMISSION DURING AUTONOMOUS BRAKING

(71) Applicant: GM GLOBAL TECHNOLOGY OPERATIONS LLC, Detroit, MI (US)

(72) Inventors: Michael G. Carpenter, Romeo, MI (US); Chad T. Zagorski, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 190 days.

(21) Appl. No.: 15/623,673

(22) Filed: Jun. 15, 2017

(65) Prior Publication Data

US 2018/0362029 A1 Dec. 20, 2018

(51) Int. Cl.
*B60W 30/09* (2012.01)
*B60T 7/12* (2006.01)
*B60W 10/02* (2006.01)
*B60W 10/18* (2012.01)
*B60W 30/18* (2012.01)
*F16D 48/02* (2006.01)
(Continued)

(52) U.S. Cl.
CPC ............... *B60W 30/09* (2013.01); *B60T 7/12* (2013.01); *B60T 7/22* (2013.01); *B60W 10/02* (2013.01); *B60W 10/18* (2013.01); *B60W 30/18109* (2013.01); *F16D 48/02* (2013.01); *F16D 48/066* (2013.01); *B60T 2201/022* (2013.01); *B60W 2510/0208* (2013.01); *B60W 2510/0638* (2013.01); *B60W 2550/00* (2013.01); *B60W 2710/022* (2013.01); *B60W 2710/182* (2013.01); *F16D 25/14* (2013.01); *F16D 2048/0227* (2013.01); *F16D 2500/1026* (2013.01); *F16D 2500/10412* (2013.01); *F16D 2500/3067* (2013.01); *F16D 2500/3128* (2013.01)

(58) Field of Classification Search
None
See application file for complete search history.

(56) References Cited

U.S. PATENT DOCUMENTS 6,218,743 B1 * 4/2001 Hayashi ................ F02N 11/103
200/61.28
6,314,801 B1 * 11/2001 Reggiardo .............. F16H 61/20
73/112.01

(Continued)

*Primary Examiner* — Timothy Hannon
(74) *Attorney, Agent, or Firm* — Lorenz & Kopf, LLP (57) ABSTRACT

Systems and methods are provided for actuating a clutch of a manual transmission of a vehicle comprising. An automatic emergency braking (AEB) system is configured to automatically initiate an AEB event and a brake controller is configured to automatically actuate a braking system of the vehicle. A powertrain controller in is configured to monitor vehicle parameters and determine when an engine of the vehicle is nearing stall. A clutch control module is configured to actuate a clutch hydraulic master cylinder and actuate the clutch. A vehicle sensor network is configured to detect objects surrounding the vehicle. The AEB system is configured to initiate the AEB event based on detected objects surrounding the vehicle and, when the AEB event is initiated, instruct the brake controller to automatically actuate the braking system and instruct the clutch control module to actuate the clutch when the vehicle is nearing stall.

9 Claims, 4 Drawing Sheets

(51) Int. Cl.
*F16D 48/06* (2006.01)
*B60T 7/22* (2006.01)

(56) References Cited

U.S. PATENT DOCUMENTS

| | | | | |
|---|---|---|---|---|
| 2002/0020600 A1* | 2/2002 | Reik | ............... | F16D 25/083 192/70.27 |
| 2009/0164079 A1* | 6/2009 | Stabrey | ............. | B60T 8/1755 701/70 |
| 2014/0095038 A1* | 4/2014 | Breu | ............... | B60W 10/02 701/67 |

* cited by examiner

METHODS AND SYSTEMS OF ACTUATING A CLUTCH OF A MANUAL TRANSMISSION DURING AUTONOMOUS BRAKING

TECHNICAL FIELD

The present disclosure generally relates to vehicle clutches, and more particularly relates to methods and systems for automatically actuating the clutch of a manual transmission of a vehicle during autonomous braking.

BACKGROUND

Modern vehicles are often equipped with Automatic Emergency Braking (AEB) systems that are designed to automatically apply the vehicle's brakes when an imminent collision is detected in an attempt to avoid the collision, when possible, or to mitigate the severity of the crash if avoidance is not possible. On vehicles with automatic transmissions, the AEB system can apply the brakes and bring the vehicle to a complete stop without stalling the engine. In contrast, when the vehicle has a manual transmission, if the brakes are applied to slow the vehicle, eventually the engine will stall unless the AEB application is aborted beforehand. If the engine stalls, the vehicle may become difficult to control and will further have to be restarted before being able to drive away.

In order to prevent the engine from stalling, the clutch must be used to disengage the engine from the transmission. This is typically done by the driver depressing the clutch pedal with their foot to actuate the clutch. However, this required driver involvement makes the full implementation of the AEB to autonomously bring the vehicle to a stop inherently less effective. For example, in order for the vehicle's powertrain to remain running after the stop, the driver would have to actuate the clutch during the AEB and the AEB would be reliant on driver involvement.

Accordingly, it is desirable to provide systems and methods that allow the AEB system to autonomously actuate the clutch during an emergency braking situation to disengage the engine from the manual transmission. Furthermore, other desirable features and characteristics of the present invention will become apparent from the subsequent detailed description and the appended claims, taken in conjunction with the accompanying drawings and the foregoing technical field and background.

SUMMARY

Systems and methods are provided for testing a vehicle braking system. In a non-limiting embodiment, a method for actuating a clutch of a manual transmission of a vehicle includes determining that an automatic emergency braking (AEB) system has initiated an AEB event and monitoring vehicle parameters to determine when an engine of the vehicle is nearing stall during the AEB event. The method further includes automatically actuating the clutch to disengage the engine from the manual transmission and continuing to actuate the clutch for the duration of the AEB event. The method further includes automatically releasing the clutch when the AEB event has completed.

In a non-limiting embodiment, a system for actuating a clutch of a manual transmission of a vehicle includes an automatic emergency braking (AEB) system configured to automatically initiate an AEB event and a brake controller in communication with the AEB system that is configured to automatically actuate a braking system of the vehicle. The system further includes a powertrain controller in communication with the AEB system that is configured to monitor vehicle parameters and determine when an engine of the vehicle is nearing stall. The system further includes a clutch control module in communication with the AEB system that is configured to actuate a clutch hydraulic master cylinder and actuate the clutch. The system further includes a vehicle sensor network in communication with the AEB system that is configured to detect objects surrounding the vehicle. The AEB system is configured to initiate the AEB event based on detected objects surrounding the vehicle and, when the AEB event is initiated, instruct the brake controller to automatically actuate the braking system and instruct the clutch control module to actuate the clutch when the vehicle is nearing stall.

In a non-limiting embodiment, a system for actuating a clutch of a manual transmission of a vehicle includes a vehicle sensor network configured to detect objects surrounding the vehicle and generate sensor data and an automatic emergency braking (AEB) system configured to automatically initiate an AEB event based on the sensor data. The system further includes a clutch control module in communication with the AEB system that is configured to actuate a clutch hydraulic master cylinder and actuate the clutch. When the AEB event is initiated, the AEB system is configured to instruct the clutch control module to actuate the clutch.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
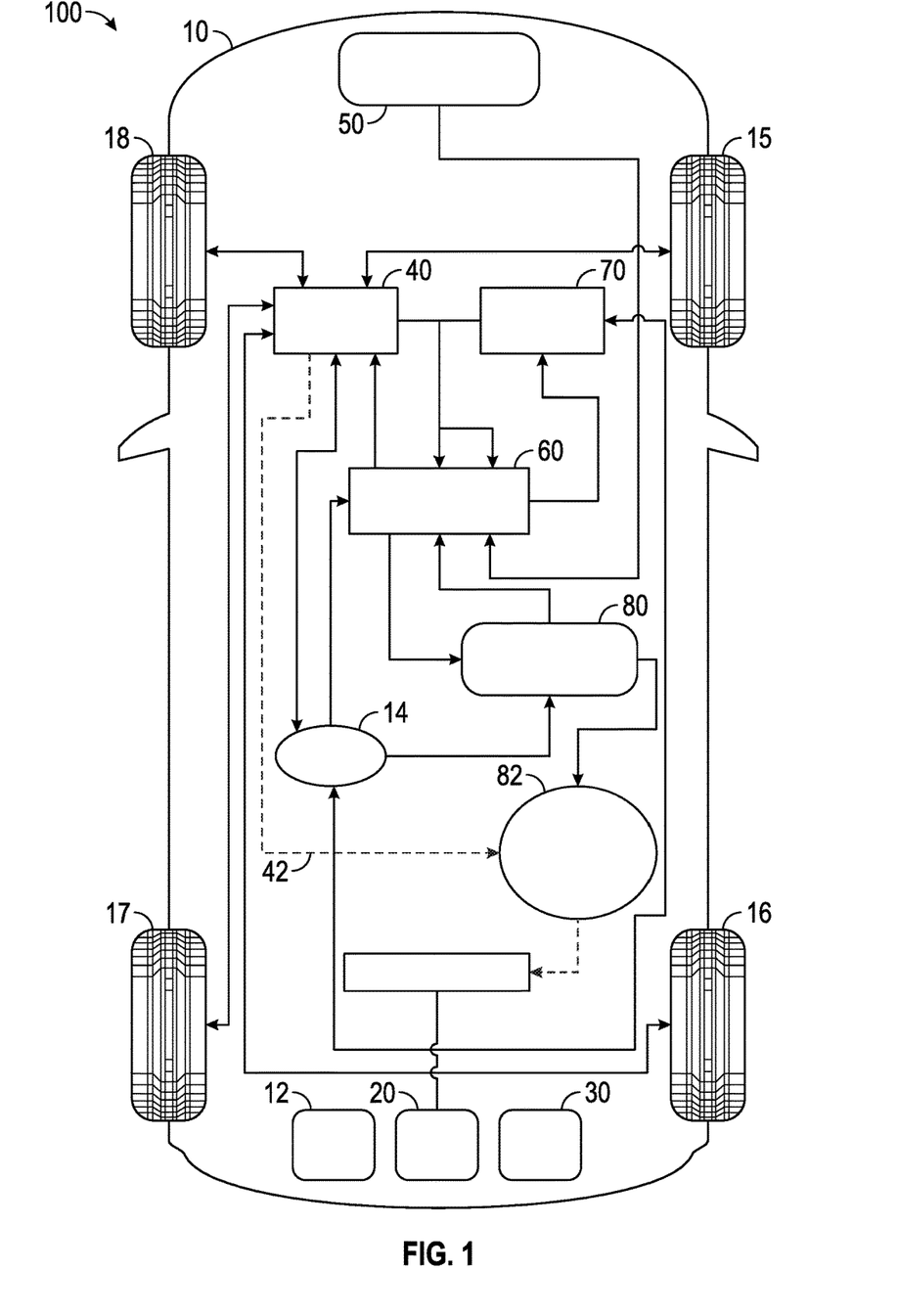
FIG. 1 is a functional block diagram illustrating a vehicle having a system for actuating a clutch of a manual transmission, in accordance with an embodiments.

With reference to FIG. 1, a system shown generally at 100 is associated with a vehicle 10 in accordance with various embodiments. In general, system 100 actuates a clutch 20 of a manual transmission 30 of the vehicle 10 to disengage the engine 12 from the manual transmission 30.

While the various components of the system 100 and vehicle 10 are shown as blocks within the vehicle 10, one skilled in the art will appreciate that their arrangement within the vehicle 10 should not be interpreted as limiting. Connections between the various components are depicted with lines to indicate electronic communication that may be handled by a communications bus or wireless communication protocol. Furthermore, while the components are depicted as separate blocks for understanding, one skilled in the art will appreciate that various hardware modules may be combined onto a single circuit board without departing from the spirit of the disclosure.

In various embodiments, the vehicle 10 is depicted in the illustrated embodiment as a passenger car, but it should be appreciated that any other vehicle including motorcycles, trucks, sport utility vehicles (SUVs), recreational vehicles (RVs), road going vehicles, etc., can also be used.

As depicted in FIG. 1, the vehicle 10 generally includes an engine 12, clutch 20, a manual transmission 30, and the system 100 for actuating the clutch 20. The engine 12 may, in various embodiments, include an internal combustion engine, an electric machine such as a traction motor, and/or a fuel cell propulsion system. The manual transmission 20 is configured to transmit power from the engine 12 to the vehicle wheels 15-18 according to selectable speed ratios. A brake controller 40 is configured to actuate a master cylinder and provide hydraulic fluid to brakes at each of the vehicle wheels 15-18.

The vehicle sensor network 50 includes one or more sensing devices throughout the vehicle 10 that sense observable conditions of the exterior environment and/or the interior environment of the vehicle 10. The sensing devices can include, but are not limited to, radars, lidars, global positioning systems, optical cameras, thermal cameras, ultrasonic sensors, wireless communications to other vehicles and the roadway infrastructure, electronic maps and/or other sensors. In a non-limiting embodiment, the vehicle sensor network 50 is an object detection network configured to predict when the vehicle 10 may collide with an object in the environment.

An automatic emergency braking (AEB) system 60 is configured to automatically initiate an AEB event. Automatic emergency braking systems generally detect an impending forward crash with another vehicle in time to avoid or mitigate the crash. These systems first alert the driver 14 to take corrective action to avoid the crash. If the driver's 14 response is not sufficient to avoid the crash, the AEB system 60 instructs the brake controller 40 to automatically apply the brakes. Since many modern vehicles 10 come equipped with anti-lock brakes and stability control, much of the functionality necessary to implement the AEB system 60 is already present in the vehicle. As detailed above, when the vehicle 10 is equipped with an automatic transmission, the AEB system 60 can instruct the brake controller 40 to bring the vehicle 10 to a complete stop without needing to take any action with the transmission. However, when the vehicle 10 has a manual transmission, slowing or stopping the vehicle 10 while the manual transmission 30 is still in gear can cause the engine 12 to stall which may make the vehicle 10 more difficult to handle and require a restart before continuing to drive.

The AEB system 60 generally includes a processor and a memory. As detailed above, the AEB system 60 and other components of the system 100 on the vehicle may be implemented as discrete control modules, or as a single hardware unit. The processor can be any custom made or commercially available processor, a central processing unit (CPU), a graphics processing unit (GPU), an auxiliary processor among several processors associated with the AEB system 60, a semiconductor based microprocessor (in the form of a microchip or chip set), a macroprocessor, any combination thereof, or generally any device for executing instructions. The AEB system 60 may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the AEB system 60 in initiating an AEB event for the vehicle 10.

The vehicle 10 further includes a powertrain controller 70 that is configured to monitor vehicle parameters and determine when the engine 12 is nearing stall. In a non-limiting embodiment, the vehicle parameters include engine speed, vehicle speed, current gear selected, clutch engagement status, or a combination thereof. As detailed above, the manual transmission 30 is mechanically connected to the engine 12 via the clutch 20. As the vehicle speed slows during the AEB event, the engine speed must similarly slow down which can create a situation in which the engine 12 may stall. If the engine 12 stalls, various vehicle components may lose power, the steering may lose power assistance, the vehicle 10 may become difficult to control, and the driver 14 may not be able to regain control of the vehicle 10 quickly since the engine 12 will need to be restarted. The powertrain controller 70 monitors the vehicle parameters, determines that the engine 12 is nearing stall, and alerts the AEB system 60 to actuate the clutch 20 to decouple the engine 12 from the manual transmission 30.

A clutch control module 80 is in communication with a clutch hydraulic master cylinder 82 to hydraulically actuate the clutch 20. Under normal operation of the vehicle 10, the driver 14 presses a clutch pedal with their foot which is interpreted by the clutch control module 80 to actuate the clutch. This allows the driver 14 to change gears or to place the manual transmission 30 into neutral. Accordingly, the clutch control module 80 interprets the input from the driver 14 through the clutch pedal and actuates the clutch 20 to decouple the engine 12 from the manual transmission 30.

The AEB system 60 initiates the AEB event based on sensor data from the vehicle sensor network 50 relating towards detected objects surrounding the vehicle 10. When the AEB system 60 determines that the vehicle 10 may collide with objects, the AEB system is used to alert the other vehicle systems to take action. The AEB system 60 instructs the brake controller 40 to automatically actuate the braking system based on the AEB event. As the vehicle 10 slows during the AEB event, the powertrain controller 70 monitors the vehicle parameters to determine when the engine 12 will stall. When a stall of the engine 12 is nearing, the AEB system 60 instructs the clutch control module 80 to actuate the clutch 20 and decouple the engine 12 from the manual transmission 30.

In a non-limiting embodiment, the system 100 further includes a clutch hydraulic line 42 in fluid communication with the brake controller 40 and the clutch hydraulic master cylinder 82. As detailed above, the brake controller 40 already has the components necessary to control the hydraulically operated brakes. In a non-limiting embodiment, the clutch hydraulic line 42 is a new output from the brake controller 40 and provides the necessary hydraulic pressure and fluid to the clutch hydraulic master cylinder 82 to actuate the clutch 20. One skilled in the art will appreciate that slight modification of the brake controller 40 would be necessary to provide appropriate hydraulic pressure to disengage the clutch 20 at the appropriate time. By leveraging the existing capability of the brake controller 40 to supply hydraulic fluid based on the AEB event trigger, the clutch hydraulic line 42 provides the structure necessary to actuate the clutch 20 without modifying the existing operation of the clutch control module 80 or the clutch hydraulic master cylinder 82.

In a non-limiting embodiment, the AEB system 60 actuates the clutch 20 to decouple the engine 12 and the manual transmission 30 until the AEB event is over or until the driver 14 regains control of the vehicle 10. For example, the clutch 20 may be released by the AEB system 60 when the driver 14 fully depresses the clutch pedal, signifying that the driver 14 is in control of the vehicle 10. In a non-limiting embodiment, the clutch control module 80 transitions the clutch 20 from an actuated state to a released state over a predetermined period of time. For example, after the clutch 20 has been actuated and the AEB event is over, the clutch control module 80 may gradually release the clutch 20 so as to smoothly transition to driving the vehicle 10 following the AEB event or when the manual transmission 30 is in neutral.

In a non-limiting embodiment, the clutch control module 80 transition the clutch from the actuated state to the released state based on vehicle parameters from the powertrain controller 70. For example, after the clutch 20 has been actuated and the AEB event is over, the clutch control module 80 may gradually release the clutch 20 when the vehicle speed matches the engine speed, or when the proper gear is selected such that the vehicle speed and the engine speed are sufficiently matched. Stated differently, the releasing of the clutch 20 is based on the operation of the engine 12 to further smooth the transition to recouple the engine 12 with the manual transmission 30.

In a non-limiting embodiment, the AEB system 60 is further configured to delay actuating the clutch 20 to take advantage of engine braking to help slow down the car. In a non-limiting example, the clutch 20 is not immediately actuated to additionally leverage engine braking to further slow the vehicle 10 during the AEB event.

Figure 2:
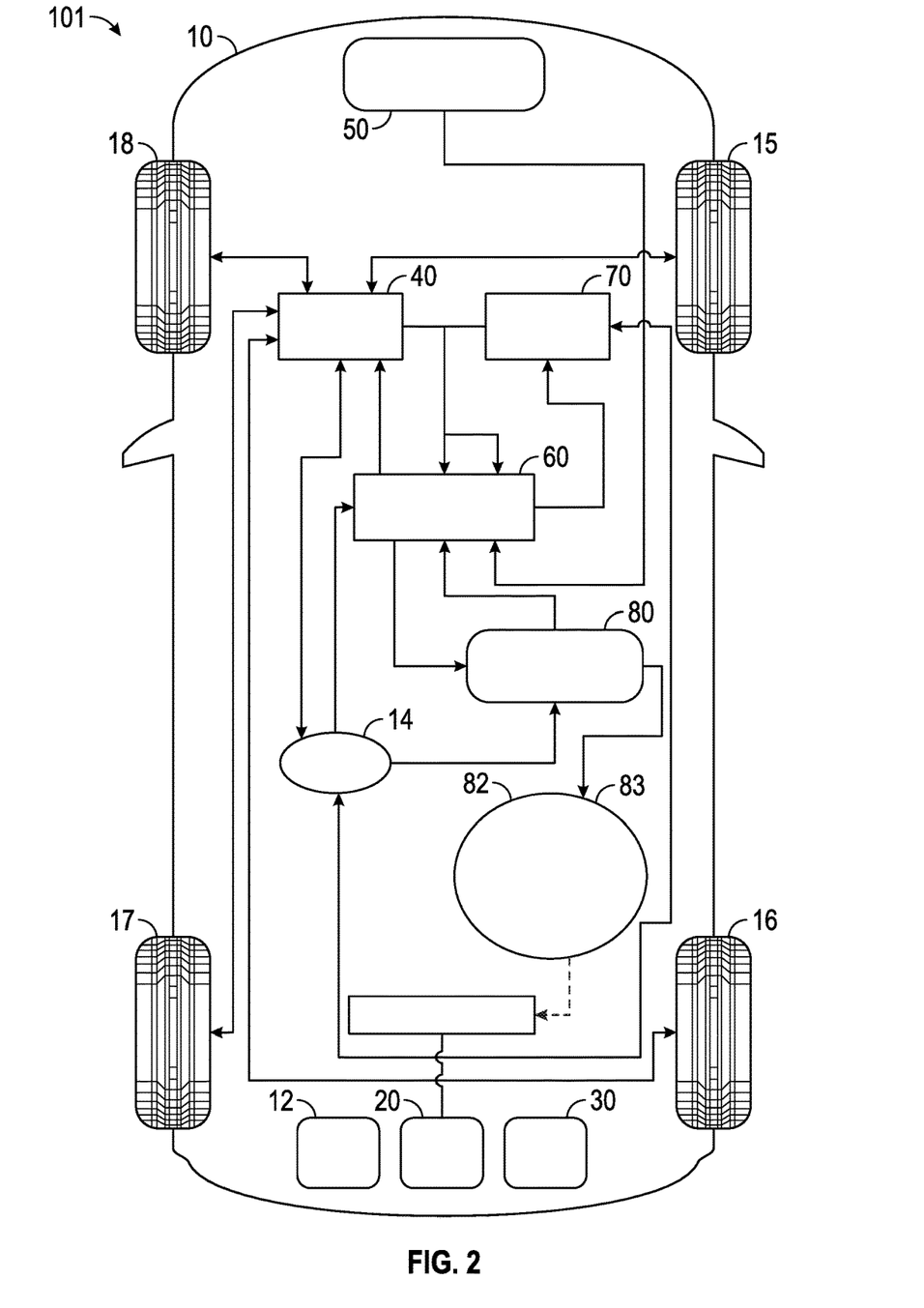
FIG. 2 is a functional block diagram illustrating a vehicle having a system for actuating a clutch of a manual transmission, in accordance with another embodiment.

Referring now to FIG. 2 and with continued reference to FIG. 1, a vehicle 10 having a system 101 for actuating a clutch 20 of a manual transmission 30 is shown according to another embodiment. As the embodiment of the system 101 from FIG. 2 shares common components from the embodiment of the system 100 from FIG. 1, the same reference numerals will be used when appropriate and the following discussion will focus on the differences in the system 101 relative to system 100.

In the embodiment of the system 100 from FIG. 1, a clutch hydraulic line 42 was provided from the brake controller 40 to provide hydraulic fluid to the clutch hydraulic master cylinder 82. In contrast, the embodiment of the system 101 in FIG. 2 has an electronic clutch control module 83 integrated with the clutch hydraulic master cylinder 82. In a non-limiting embodiment, the electronic clutch control module 83 has a hydraulic pump and the necessary electronic controls to activate the clutch 20 when instructed by the AEB system 60.

Relative to the system 100 from FIG. 1, the system 101 from FIG. 2 has combined the functionality of the clutch hydraulic master cylinder 82 with an electronic clutch control module 83 into a single unit.

Figure 3:
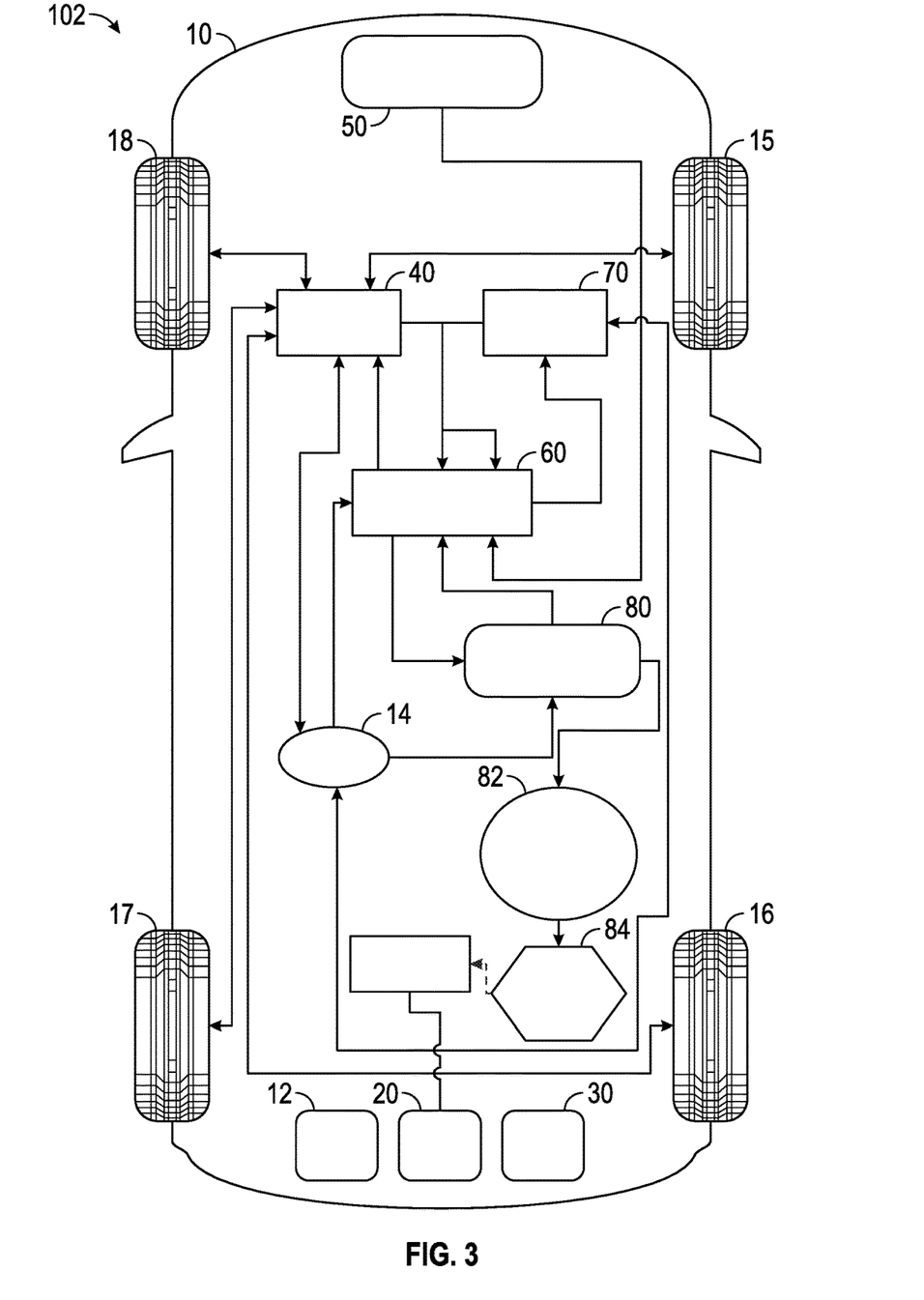
FIG. 3 is a functional block diagram illustrating a vehicle having a system for actuating a clutch of a manual transmission, in accordance with another embodiment.

Referring now to FIG. 3 and with continued reference to FIGS. 1 and 2, a vehicle 10 having a system 102 for actuating a clutch 20 of a manual transmission 30 is shown according to another embodiment. As the embodiment of the system 102, from FIG. 3 shares common components from the embodiments of the systems 100, 101 from FIGS. 1 and 2, the same reference numerals will be used when appropriate and the following discussion will focus on the differences in the system 102 relative to systems 100, 101.

In the embodiment of the system 100 from FIG. 1, a clutch hydraulic line 42 was provided from the brake controller 40 to provide hydraulic fluid to the clutch hydraulic master cylinder 82. In the embodiment of the system 101 in FIG. 2, an electronic clutch control module 83 was integrated with the clutch hydraulic master cylinder 82. In a non-limiting embodiment of the system the electronic clutch control module 84 has a hydraulic pump and the necessary electronic controls to activate the clutch 20 when instructed by the AEB system 60, however it is a separate unit from clutch hydraulic master cylinder 82.

Relative to the systems 100, 101 from FIGS. 1 and 2, the system 102 from FIG. 3 maintains the clutch hydraulic master cylinder 82, as depicted in FIG. 1, but rather than integrating the electronic clutch control module 83 into a single unit, the electronic clutch control module 84 is a separate component.

One skilled in the art will appreciate that the choice of embodiment is a design choice based on part cost, packaging, durability, etc., such that the relative preference of the previously described embodiments of the systems 100, 101, 102 is dependent on the particular vehicle being considered. For example, in situations where part cost and economies of scale make it prohibitive to change any existing components and only add in the additional functionality in the form of the clutch control module 84, then the embodiment of the system 102 from FIG. 3 would be best suited.

Figure 4:
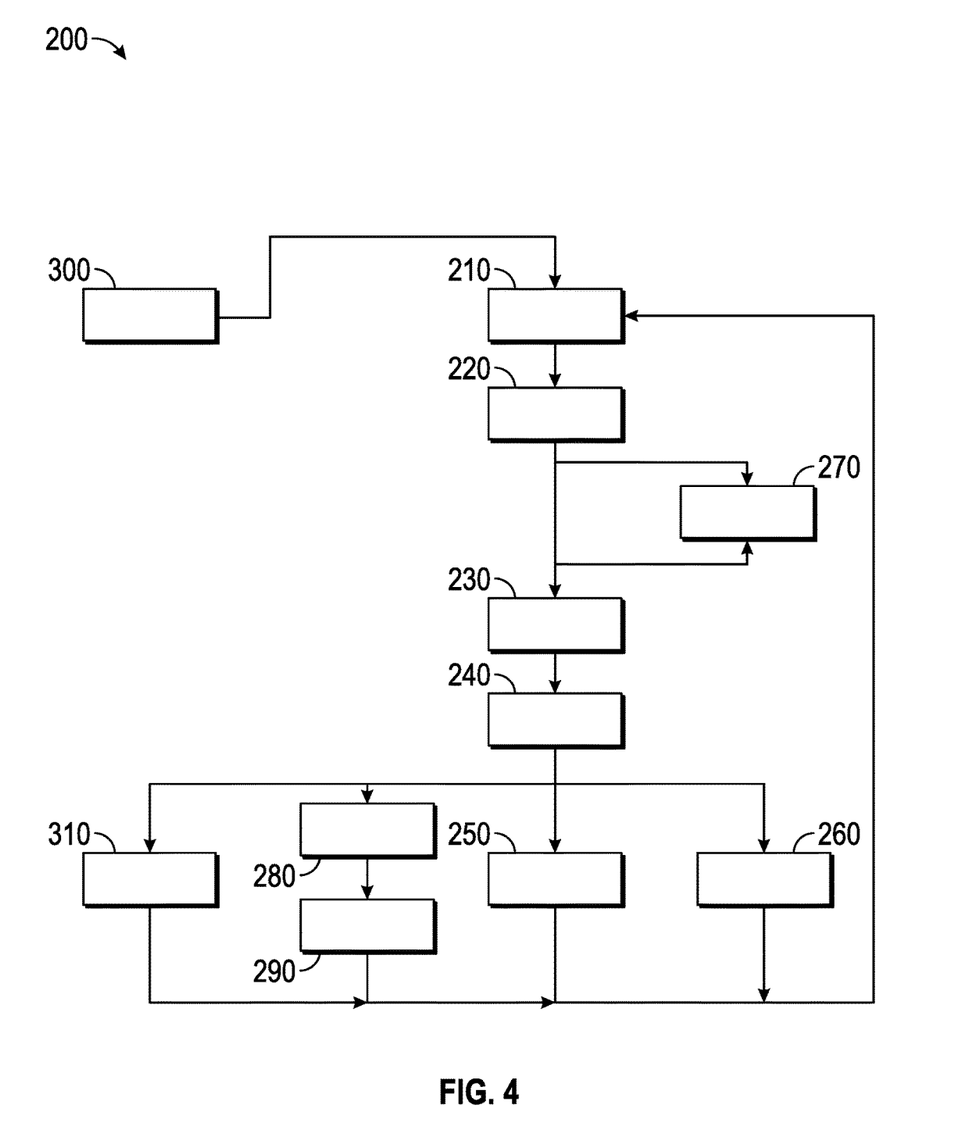
FIG. 4 is a flowchart illustrating a method for actuating a clutch of a manual transmission of a vehicle, in accordance with various embodiments.

Referring now to FIG. 4, and with continued reference to FIGS. 1-3, a flowchart illustrates a control method 200 for actuating a clutch of a manual transmission of a vehicle that can be performed by the systems 100, 101, 102 of FIGS. 1-3 in accordance with the present disclosure. As can be appreciated in light of the disclosure, the order of operation within the method is not limited to the sequential execution as illustrated in FIG. 4, but may be performed in one or more varying orders as applicable and in accordance with the present disclosure. In various embodiments, the method 200 can be scheduled to run based on one or more predetermined events, and/or can run continuously during operation of the vehicle 10.

In general, method 200 actuates the clutch of a vehicle with a manual transmission during an AEB event to decouple the engine and the manual transmission. When an AEB event has been initiated, the method monitors vehicle parameters to determine when an engine of the vehicle is nearing stall during the AEB event. The method 200 then automatically actuates the clutch to disengage the engine from the manual transmission, keeps the clutch actuated over the duration of the AEB event, and automatically releases the clutch when the AEB event has completed as detailed above.

The method 200 starts at 210 and determines that an automatic emergency braking (AEB) system has initiated an AEB event. The method 200 proceeds to 220 and monitors vehicle parameters to determine when an engine of the vehicle is nearing stall during the AEB event. At 230 the method 200 automatically actuates the clutch to disengage the engine from the manual transmission. At 240, the method 200 continues to actuate the clutch for the duration of the AEB event. At 250, the method automatically releases the clutch when the AEB event has completed. The method then returns to 210 and continues to determine when an AEB event has been initiated.

In a non-limiting embodiment, the method 200 further includes 260 and automatically releases the clutch when a clutch pedal of the vehicle is depressed by the driver. As detailed above with respect to the discussion of the systems 100, 101, 102, when the driver takes control of the vehicle, the method returns to 210.

In a non-limiting embodiment, the method 200 further includes 270 and supplies a clutch hydraulic master cylinder with hydraulic fluid from a braking system during the AEB event. As detailed with respect to the embodiment of the system 100 from FIG. 1, the clutch hydraulic line 42 provides the structure necessary to actuate the clutch 20 without modifying the existing operation of the clutch control module 80 or the clutch hydraulic master cylinder 82. Following 270, the method 200 proceeds to 230 and actuates the clutch.

In a non-limiting embodiment, the method 200 further includes 280 and determines that a driver has taken control of the vehicle. Following 280, the method 200 proceeds to 290 and automatically releases the clutch when the driver has taken control of the vehicle. When the driver takes control of the vehicle, the method 200 returns to 210.

In a non-limiting embodiment, the method 200 further includes 300 and initiates the AEB event based on collision data from a vehicle sensor network. Following 300, the method 200 proceeds to 210 and determines that the AEB event has been initiated.

In a non-limiting embodiment, the method 200 further includes 310 and transitions the clutch from an actuated state to a released state over a predetermined period of time based on vehicle parameters from a powertrain controller. Following 310, the method 200 returns to 210.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for actuating a clutch of a manual transmission of a vehicle comprising:
   a vehicle sensor network configured to detect objects surrounding the vehicle and generate sensor data;
   an automatic emergency braking (AEB) system configured to automatically initiate an AEB event based on the sensor data;
   a clutch hydraulic line fluidly coupling a hydraulic braking system with a clutch hydraulic master cylinder and configured to supply hydraulic fluid to the clutch hydraulic master cylinder;
   a brake controller in communication with the AEB system, the brake controller configured to automatically actuate a braking system of the vehicle when the AEB event is initiated, the brake controller further configured to control fluid flow and pressure from the braking system to the clutch hydraulic master cylinder when the AEB event is initiated,
   a clutch control module in communication with the AEB system, the clutch control module configured to
   determine that an automatic emergency braking (AEB) system has initiated an AEB event;
   automatically actuate the clutch to disengage the engine from the manual transmission;
   continue to actuate the clutch for the duration of the AEB event; and
   release the clutch when the AEB event has completed.

2. The system of claim 1, further comprising:
   a powertrain controller in communication with the AEB system, the powertrain controller configured to monitor vehicle parameters and determine when an engine of the vehicle is nearing stall and communicate the determination to the
   wherein the clutch control module is further configured to instruct the clutch control module to actuate the clutch when the vehicle is nearing stall.

3. The system of claim 1, further comprising:
   a clutch pedal,
   wherein the clutch control module is further configured to automatically release the clutch when the clutch pedal of the vehicle is depressed.

4. The system of claim 3, wherein the clutch control module is further configured to transition the clutch from an actuated state to a released state based on a predetermined period of time starting from when the AEB system has initiated the AEB event.

5. The system of claim 4, wherein the clutch control module is further configured to transition the clutch from the actuated state to the released state based on vehicle parameters from a powertrain controller.

6. The system of claim 5, wherein the vehicle parameters include vehicle speed and engine speed.

7. They system of claim 5, wherein the vehicle parameters include transmission gear.

8. The system of claim 5, wherein the clutch control module is further configured to transition the clutch from the actuated state to the released state based on a predetermined period of time starting from when the AEB event is over.

9. The system of claim 1, wherein the clutch control module is integrated within the brake controller.

* * * * *